(12) United States Patent
Neale et al.

(10) Patent No.: US 9,891,891 B2
(45) Date of Patent: Feb. 13, 2018

(54) SYSTEMS AND METHODS FOR INTEGRATION OF CARRIER-BASED SMS AND VOICE FUNCTIONALITY WITHIN API PLATFORM

(71) Applicant: Inteliquent, Inc., Chicago, IL (US)

(72) Inventors: Ian Neale, Wanaka (NZ); Charles Drexler, Plano, TX (US); Richard Rygg, South Pasadena, CA (US); Scott Daniel, Fullerton, CA (US)

(73) Assignee: Inteliquent, Inc., Chicago, IL (US)

( * ) Notice: Subject to any disclaimer, the term of this patent is extended or adjusted under 35 U.S.C. 154(b) by 0 days.

(21) Appl. No.: 15/152,118

(22) Filed: May 11, 2016

(65) Prior Publication Data

US 2016/0335056 A1    Nov. 17, 2016

Related U.S. Application Data

(60) Provisional application No. 62/159,752, filed on May 11, 2015.

(51) Int. Cl.
*H04W 4/00* (2009.01)
*G06F 9/44* (2006.01)
*H04L 29/08* (2006.01)
*H04W 4/14* (2009.01)
*G06F 9/54* (2006.01)
*H04W 88/16* (2009.01)

(52) U.S. Cl.
CPC .................. *G06F 8/30* (2013.01); *G06F 9/54* (2013.01); *H04L 67/02* (2013.01); *H04W 4/14* (2013.01); *H04W 88/16* (2013.01)

(58) Field of Classification Search
CPC ........... H04W 4/14; H04W 88/16; G06F 8/30; G06F 9/54; H04L 67/02
USPC ........................................................ 455/466
See application file for complete search history.

(56) References Cited

U.S. PATENT DOCUMENTS

| 6,542,593 | B1 | 4/2003 | Bowman-Amuah |
| 6,950,441 | B1 | 9/2005 | Kaczmarczyk et al. |
| 8,064,354 | B1 | 11/2011 | Barghouthi |
| 8,102,988 | B2 | 1/2012 | Gavillet et al. |
| 8,171,146 | B2 | 5/2012 | Chen et al. |
| 8,208,413 | B1 | 6/2012 | Bienn et al. |
| 8,291,011 | B2 | 10/2012 | Abu-Hakima et al. |
| 8,417,224 | B1 | 4/2013 | Young |
| 8,526,325 | B2 | 9/2013 | Chen et al. |
| 2004/0109455 | A1 | 6/2004 | Jouppi et al. |

(Continued)

FOREIGN PATENT DOCUMENTS

| EP | 1753198 A1 | 2/2007 |
| KR | 1020070003740 A | 1/2007 |

(Continued)

OTHER PUBLICATIONS

International Search Report and Written Opinion for PCT/US2016/031837 dated Aug. 11, 2016.

(Continued)

*Primary Examiner* — William Nealon
(74) *Attorney, Agent, or Firm* — William J. Lenz, Esq.; Neal, Gerber & Eisenberg LLP

(57) ABSTRACT

Systems and methods for integration of carrier-based service functionality with API-based functionality emanating from a single service provider or service network.

9 Claims, 3 Drawing Sheets

(56) References Cited

U.S. PATENT DOCUMENTS

| | | |
|---|---|---|
| 2004/0218529 A1 | 11/2004 | Rodosek et al. |
| 2005/0018659 A1 | 1/2005 | Gallant et al. |
| 2005/0186974 A1 | 8/2005 | Cai |
| 2005/0201302 A1 | 9/2005 | Gaddis et al. |
| 2006/0193461 A1 | 8/2006 | Gavillet et al. |
| 2007/0244987 A1 | 10/2007 | Pedersen et al. |
| 2008/0279183 A1 | 11/2008 | Wiley et al. |
| 2009/0131090 A1* | 5/2009 | Jo ................. H04L 51/066 455/466 |
| 2010/0098057 A1* | 4/2010 | Stewart ............ H04M 3/46 370/352 |
| 2010/0167765 A1* | 7/2010 | Sarmah ........... H04L 12/5895 455/466 |
| 2011/0136520 A1 | 6/2011 | Knotts |
| 2012/0136891 A1 | 5/2012 | Neale et al. |
| 2013/0208729 A1* | 8/2013 | Evans ............... H04L 12/66 370/401 |
| 2014/0201083 A1 | 7/2014 | Nowack et al. |

FOREIGN PATENT DOCUMENTS

| | | |
|---|---|---|
| KR | 20080101561 A | 11/2008 |
| WO | WO2014190010 A1 | 11/2014 |

OTHER PUBLICATIONS

International Search Report and Written Opinion for PCT/US2013/026209 dated Jun. 18, 2013.
Extended Search Report for European Patent Application No. 13748944.9 dated Oct. 23, 2015.
CTIA, The Wireless Association, Inter-Carrier SMS Guidelines, Version 3.1, May 8, 2012.
GSMA IPX White Paper, Version 1.2, Mar. 22, 2007.
i3 Forum Technical Service—IPX Core, "Common Functionalities and Capabilities of an IPX Platform," Dec. 2012.

* cited by examiner

SYSTEMS AND METHODS FOR INTEGRATION OF CARRIER-BASED SMS AND VOICE FUNCTIONALITY WITHIN API PLATFORM

CROSS-REFERENCE TO RELATED APPLICATION

This application claims the benefit of U.S. Provisional Patent Application No. 62/159,752, filed on May 11, 2015, the content of which is incorporated herein by reference in its entirety.

TECHNICAL FIELD

This disclosure relates to the field of telecommunications, and more particularly, to integration of carrier-based telecommunications service functionality with API-based functionality emanating from a single service provider or service network.

BACKGROUND

The use of Application Programming Interfaces (APIs) to implement telecommunications services and functionality in software application development has become more prevalent in recent years. However, present systems provide such functionality in fragmented fashion, typically involving several entities or service providers. For example, application programmers may rely on an API platform offered by another entity, which, in turn, relies on one or more additional entities for various services or functionality, particularly at the telecommunications carrier or inter-carrier level. This fragmented framework introduces numerous inefficiencies and quality of service (QoS) issues, particularly for SMS and voice functionality. Furthermore, this framework also introduces many challenges affecting revenues, service delivery and fulfillment costs, and other operational costs. A particular challenge exists for telecommunications API platforms with respect to direct network access or ability to directly obtain data associated with communications sessions to more efficiently establish or otherwise provide for these sessions through the API. Existing telecommunications API platforms do not have direct access at the inter-carrier level for SMS/MMS services and often do not have the appropriate data at the most efficient points of a communications session or have to inefficiently access several sources, services or partners to obtain the data or services to adequately treat the communications session. In some instances, API platforms may not even have viable access to certain data and services that might be limited to carrier or inter-carrier network service providers.

The invention(s) described herein is/are directed, but not limited, to addressing these and other issues associated with existing systems and methods. Other aspects and benefits not related to these issues are contemplated as well.

SUMMARY

Systems and associated methods are provided for integrated API platform and telecommunication session functionality within an inter-carrier network. According to a particular and non-limiting aspect, the system comprises an API server within the inter-carrier network, where the API server allows an application or web client access to voice, SMS and MMS service functionality provided by the inter-carrier network. The system further comprises a telecommunications session server within the inter-carrier network and in communication with the API server and at least one voice soft switch element, where the telecommunications session server provides telecommunication voice session functionality to the application or web client directly from the inter-carrier network as part of the PSTN. The system additionally comprises an SMS/MMS gateway within the inter-carrier network and in communication with the API server, where the SMS/MMS gateway provides SMS/MMS functionality to the application or web client directly from the inter-carrier network as part of the SMS/MMS network.

According to another particular and non-limiting aspect, a method for providing SMS/MMS functionality direct from an inter-carrier network via an API platform comprises the steps of providing an SMS/MMS API server within the inter-carrier network; receiving, at the API server within the inter-carrier network, from an application or web client utilizing the API, an SMS or MMS communication associated with a DID number or short code that is associated with an addressable device or network element; sending the SMS or MMS communication to an SMS/MMS gateway server within the inter-carrier network; and sending the SMS or MMS communication, from the SMS/MMS gateway server, to a network point within the SMS/MMS network having access to the addressable device or network element associated with a DID number or short code.

According to yet another particular and non-limiting aspect, the DID numbers or short codes are issued by a provider of the inter-carrier network.

These and other aspects will become readily apparent from the written specification, drawings, and claims provided herein.

DETAILED DESCRIPTION OF EXEMPLARY EMBODIMENTS

Figure 1:
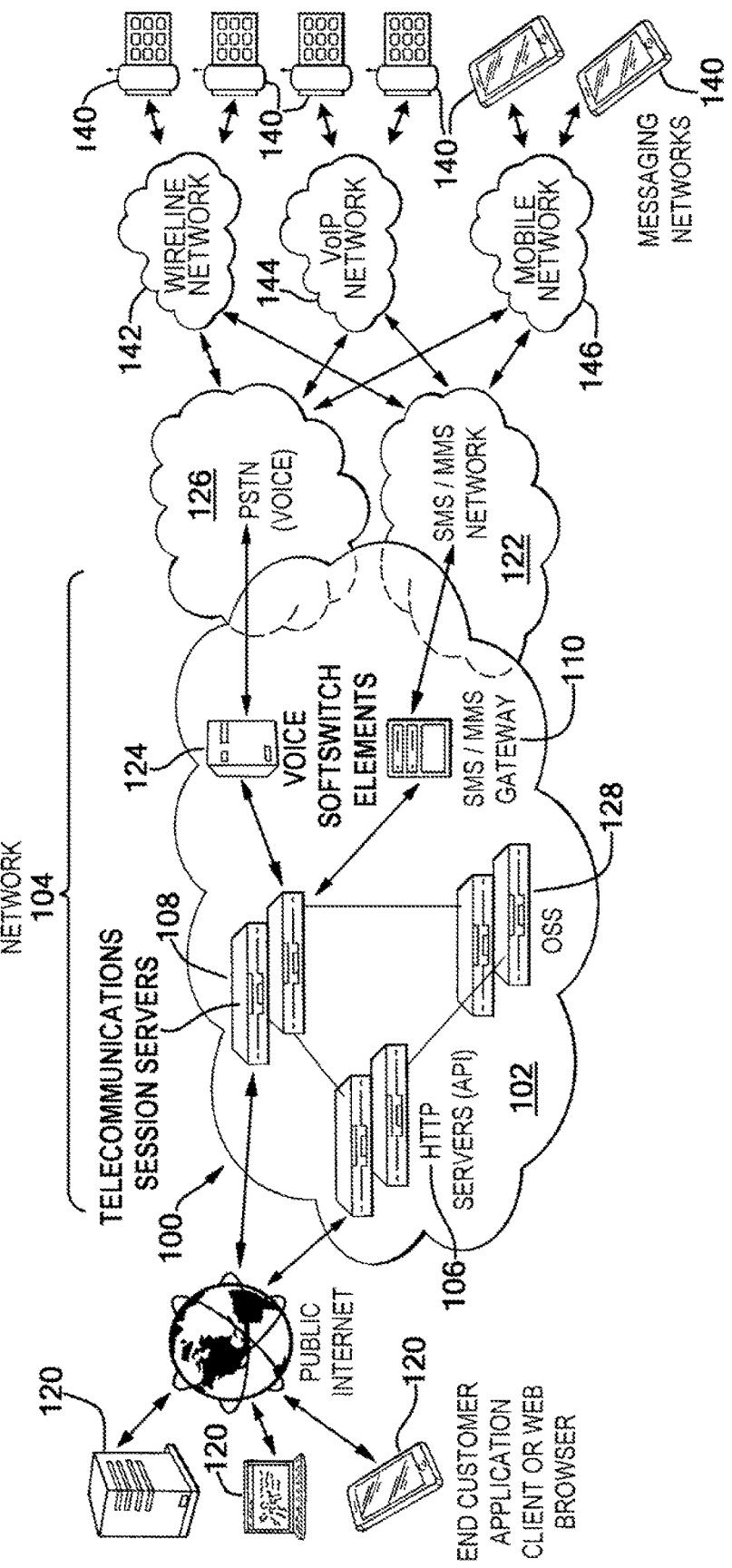
FIG. 1 is a schematic diagram illustrating an exemplary embodiment of a system in accordance with one or more aspects described herein.

The description that follows describes, illustrates and exemplifies one or more particular embodiments of the invention(s) in accordance with its principles. This description is not provided to limit the invention(s) to the embodiments described herein, but rather to explain and teach the principles of the invention(s) in such a way to enable one of ordinary skill in the art to understand these principles and, with that understanding, be able to apply them to practice not only the embodiments described herein, but also other embodiments that may come to mind in accordance with these principles. The scope of the invention(s) is/are intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates the didactic purpose of the specification. Additionally, the drawings set forth herein are not necessarily drawn to scale, and in some instances proportions may have been exaggerated to more clearly depict certain features. Such labeling and drawing practices do not necessarily implicate an underlying substantive purpose. Furthermore, one or more drawings herein may be of a purely functional schematic nature, or a combination of a functional and structural/hardware schematic nature, intended to disclose and teach functional aspects of the subject matter without necessarily limiting the disclosure to any specific structure/hardware. As stated above, the present specification is intended to be taken as a whole and interpreted in accordance with the principles of the invention(s) as taught herein and understood to one of ordinary skill in the art.

With respect to the exemplary systems, components and architecture described and illustrated herein, it should also be understood that the invention(s) may be embodied by, or employed in, numerous configurations and components, including one or more system, hardware, software, or firmware configurations or components, or any combination thereof, as understood by one of ordinary skill in the art. Accordingly, while the drawings illustrate exemplary systems including components for one or more of the embodiments contemplated herein, it should be understood that with respect to each embodiment, one or more components may not be present or necessary in the system. Furthermore, although one or more systems and associated servers, gateways, registries or databases may be described, all methods, systems, and articles of manufacture consistent with known architecture for these components are intended to be encompassed. For example, a processor may be implemented as part of one or more components as a microprocessor, microcontroller, application specific integrated circuit (ASIC), discrete logic, or a combination of other type of circuits or logic. Similarly, memories as part of one or more of these components may be DRAM, SRAM, Flash or any other type of memory. Flags, data, databases, tables, and other data structures may be separately stored and managed, may be incorporated into a single memory or database, may be distributed, or may be logically and physically organized in many different ways. Software programs, which may be described in terms of one or more code segments, may be parts of a single program, separate programs, or distributed across several memories and processors. The methods and functionality described herein may be implemented via hardware, software, and/or firmware, and processed by one or more processor-based systems, components or devices. Such methods and functionality may be described as a module or engine with the understanding that its implementation is not limited to any particular hardware, software, firmware, or device configuration, but rather encompassing all implementations/embodiments within the skill of one of ordinary skill in the art. Systems may be implemented in hardware, software, or a combination of hardware and software in one processing system or distributed across multiple processing systems. Accordingly, the invention(s) should not be construed as limited by the exemplary embodiments described herein or any of the associated didactic schematics.

The systems and associated methods described herein facilitate an integrated direct access API for voice and SMS/MMS service functionality by an inter-carrier network, thereby minimizing or eliminating many of the aforementioned inefficiencies and other problems with existing platforms.

An exemplary and non-limiting embodiment of an environment—within which a system 100 in accordance with one or more principles of the invention(s) is deployed—is schematically illustrated in FIG. 1. The system 100 is part of a single inter-carrier network 102, which is part of the broader inter-carrier network system 104, and together form the "backbone" network of the packet-based communications infrastructure. The system 100 comprises an API server 106 within the inter-carrier network 102, a telecommunications session server 108 within the inter-carrier network 102 and an SMS/MMS gateway 110 within the inter-carrier network 102. The API server 106 is accessible by an application or web client via one or more devices 120 to provide access to voice, SMS and MMS service functionality provided by the inter-carrier network 102. The SMS/MMS gateway 110 within the inter-carrier network 102 is in communication with the API server, where the SMS/MMS gateway provides SMS/MMS functionality to the application or web client via one or more devices 120 directly from the inter-carrier network 102 as part of the SMS/MMS network 122. The telecommunications session server 108 is in communication with the API server 106 and at least one voice soft switch element 124, where the telecommunications session server 108 provides telecommunication voice session functionality to the application or web client via one or more devices 120 directly from the inter-carrier network as part of the PSTN 126. The system may also include an operations support system (OSS) 128, which may comprise one or more servers, to provide one or more Business Management Level (BML), Service Management Level (SML), Network Management Level (NML), or Element Management Level (EML) functions to the system or network. The OSS 128 may also be part of the inter-carrier network separate from but capable of communication with, the system 100.

As can be seen from FIG. 1, the system 100 provides direct API SMS/MMS functionality fully integrated into the inter-carrier network 102. The system 100 also provides direct voice functionality from the inter-carrier network 102. This voice and SMS/MMS functionality integrated into the single inter-carrier network 102 provides the application or web client—via one or more devices 120—direct access to one or more devices/session destinations 140 through one or more wireline networks 142, VoIP networks 144 or mobile networks 146 as part of the PSTN 126 or SMS/MMS network 122.

In an embodiment, the API server 106 also provides access to the application programming interface to allow application or program developers to leverage the SMS/MMS/voice functionality directly from an inter-carrier network in their programs or applications, as opposed to relying on third-party APIs or services. In an embodiment, the API server 106 provides one or more databases or libraries having specifications for routines, data structures, object classes, and variables. In other embodiments, the API server 106 provides function calls for use by the application or web client. In some embodiments, the API server 106 may provide functionality services to the application or web clients via one or more protocols, such as, for example, HTTP, XML, SOAP, REST, and WebRTC. In some embodiments, the API server may also provide functionality and integration services, including access to platforms or frameworks, to the application or web clients for various operating systems, such as, for example, Apple iOS and Android SDK. In some embodiments, the API server 106 provides access to API plug-ins for various functionality. The API server 106 can also assist the application or web clients with access to or sharing of telecommunications data from the inter-carrier network that may otherwise not be directly available from third-party APIs, which can help to integrate and enhance the functionalities of the applications.

The API specification can take many forms, including an International Standard or other Standard, such as, for example, POSIX, WebRTC, HTTP, etc., vendor documentation, such as, for example, the Microsoft Windows API, or the libraries of a programming language, such as, for example, Standard Template Library in C++ or Java API.

According to an aspect of the system, the integration of the API server 106 into the inter-carrier network 102 allows the service provider of the intercarrier network 102 to directly provide voice and/or text enabled ITU.E164 DID numbers or short codes to the application or web clients, and provide termination and origination of SMS/MMS messages and voice calls associated with those numbers, in addition to functioning with numbers provided by a third-party network. Additionally, anonymization of call or text flow can be provided by assigning one or more temporary numbers to one or both of the devices/identities associated with a telecommunications session.

According to an aspect of the system, the integration of the API server 106 into the inter-carrier network 102 allows direct access to data, or other services or functionality through the inter-carrier network, such as end user and network data associated with DID numbers or short codes, or communications sessions. For example, the inter-carrier network has access to the full SIP signaling detail associated with calls, and can be used, for example, at a contact center enabled via the API service for purposes of end user identity validation or fraud prevention.

Other access to data or functionality may involve, for example, querying industry database services, CDR analysis of telecommunications traffic, dynamically pinging or otherwise interacting with the phone number, querying copies of subscription databases, querying live subscription databases, or accessing previously resolved communications data stored in a system cache to minimize networking and processing resources. This data may be leveraged to provide enhanced telecommunication functionality otherwise not directly available through third-party APIs.

According to an aspect, a method for providing SMS/MMS functionality direct from an inter-carrier network via an API platform is contemplated. The method comprises the steps of providing an SMS/MMS API server within the inter-carrier network; receiving, at the API server within the inter-carrier network, from an application or web client utilizing the API, an SMS or MMS communication associated with a DID number or short code that is associated with an addressable device or network element; sending the SMS or MMS communication to an SMS/MMS gateway server within the inter-carrier network; and sending the SMS or MMS communication, from the SMS/MMS gateway server, to a network point within the SMS/MMS network having access to the addressable device or network element associated with a DID number or short code.

Figure 2:
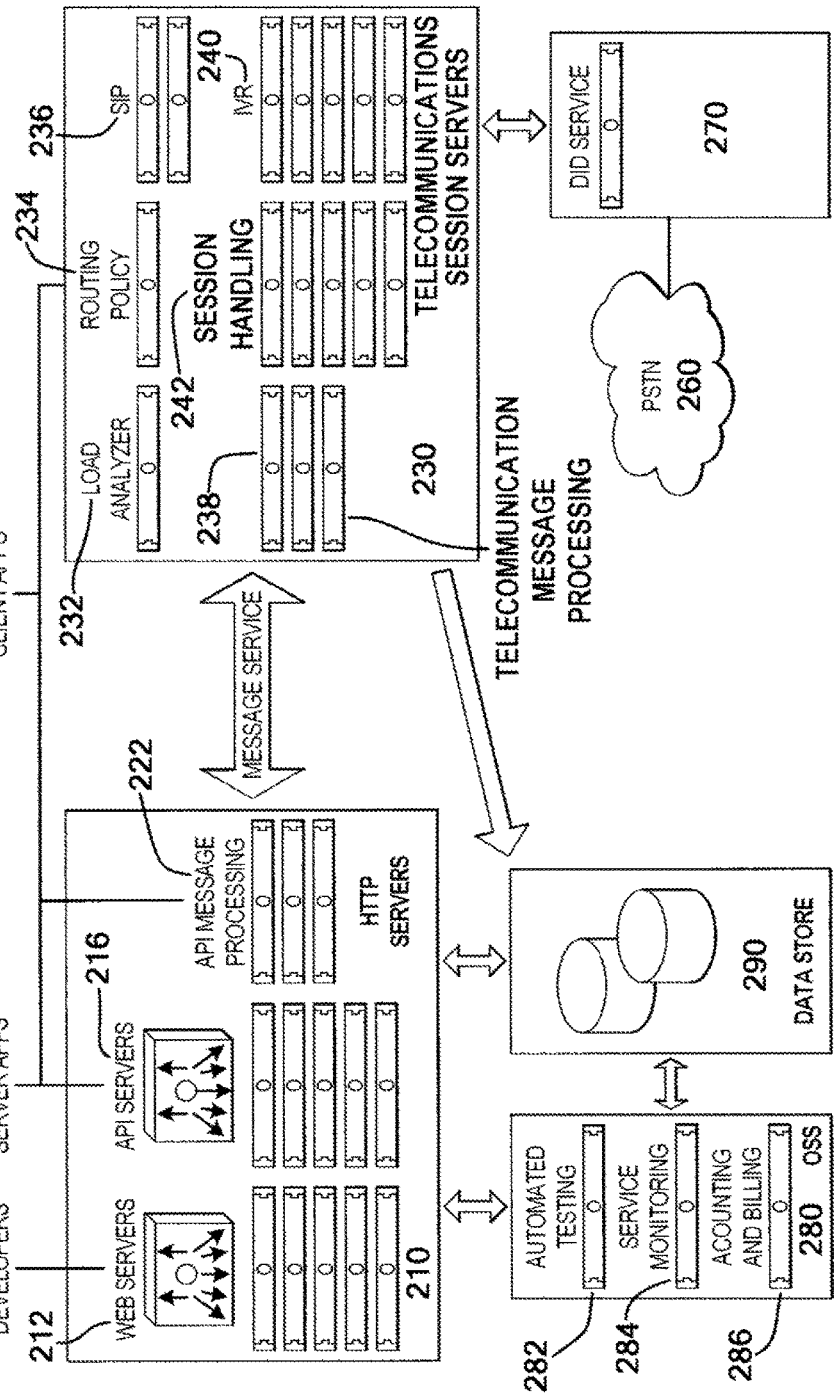
FIG. 2 is a schematic diagram illustrating an exemplary inter-carrier system architecture in accordance with one or more aspects described herein.

System 100 can be deployed in a variety of ways utilizing a variety of system architectures. By way of example, FIG. 2 illustrates an exemplary inter-carrier system architecture 200 in accordance with one or more principles described herein. As shown in FIG. 2, HTTP servers 210 provide direct API functionality within the inter-carrier framework. In this exemplary embodiment, the HTTP servers include one or more web servers 212 providing access to developers 214 for developing applications utilizing the API. The web servers 212 allow programmers to develop components and functionality in accordance with the API to support SMS/MMS functionality through the application. The HTTP servers also include API servers 216 providing functionality and service to server apps 218 or client apps 220. API message processing servers 222 process voice call and messaging, such as SMS or MMS, with the server apps 218 or client apps 220.

Telecommunication session servers 230 provide voice-based service functionality to the server apps or the client apps. The telecommunication servers may include one or more of a load analyzer server 232, a routing policy server 234, SIP servers 236, telecommunication message processing servers 238, IVR servers 240 and session handling servers 242. The telecommunication message processing servers interface with the API message processing servers 222 for integrated service through the inter-carrier network and the PSTN 260. The inter-carrier network architecture 200 may also include a DID service server 270.

The inter-carrier network architecture 200 may also include an operational support system 280, which may include, without limitation, one or more of an automated testing server 282, service monitoring server 284, and an accounting and billing server 286, to provide billing, account management, automated testing, monitoring or other services. In this embodiment, a data store 290 is provided to store and manage data associated with the system.

It should be noted that while the foregoing server functionality is exemplified as embodied in separate servers for ease of description, any of the foregoing servers/functionality may be deployed in combination or separately. Further, the servers or functionality described herein may be deployed as functional software modules and may not necessarily be associated with one or more physical servers or other hardware. Additionally, the servers or functionality described herein may also be deployed utilizing other hardware configurations that may not necessarily be categorized as a server.

In a particular embodiment, it is contemplated that functionality associated with one or more aspects of the telecommunication servers 230 be based on open source technologies, such as, for example, those offered by Freeswitch®.

Figure 3:
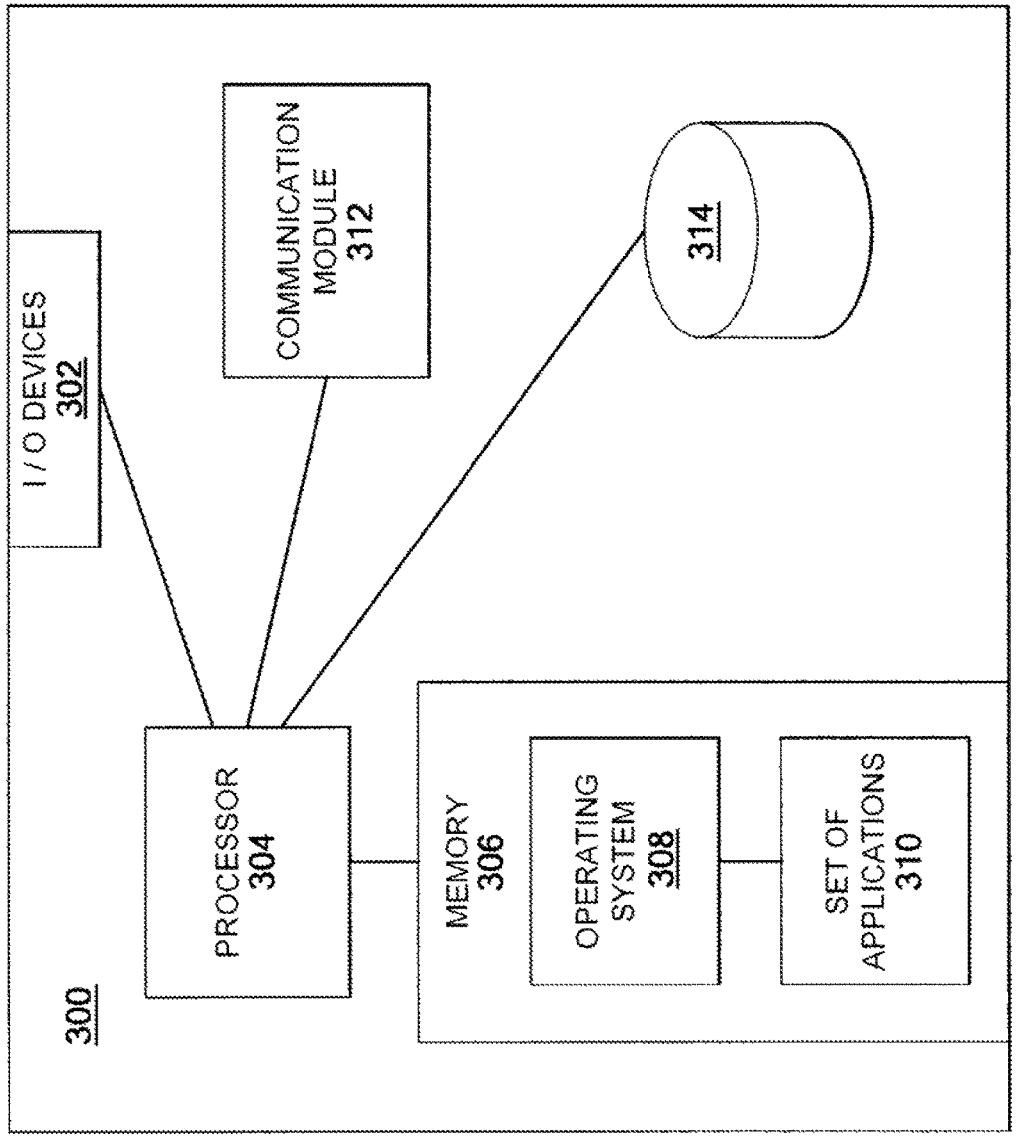
FIG. 3 is a schematic diagram of an exemplary computing device capable of supporting and facilitating one or more aspects described herein.

FIG. 3 is a block diagram of an exemplary computing device 300 that may be employed as any of the aforementioned servers, including, without limitation, the API server 106 and the telecommunications session server 108. The computing device 300 houses executable software used to facilitate the systems and methods as described herein. One or more instances of the computing device 300 may be utilized to implement any, some, or all of the components interacting with the system 100. The computing device 300 includes a memory 306 that can include a computer readable medium for implementing the systems and methods as described herein, and for implementing particular embodiments. The computing device 300 also contains executable software, some of which may or may not be unique to the systems and methods.

In some embodiments, the systems and methods can be implemented in software, as an executable program, and can be executed by one or more special or general purpose digital computer(s), such as a mainframe computer, a personal computer (desktop, laptop or otherwise), personal digital assistant, or other handheld computing device. Therefore, the computing device 300 may be representative of any computer in which the systems and methods reside or partially reside. It should also be noted that, in some embodiments, the computing device 300 may be running in a virtualization on hardware architecture, such as, for example, through Amazon® Web Services.

Generally, in terms of hardware architecture as shown in FIG. 3, the computing device 300 includes a processor 304, the memory 306, and one or more input and/or output (I/O) devices 302 (or peripherals) that are communicatively coupled via an interface such as one or more buses or other wired or wireless connections, as is known in the art. The processor 304 can be a hardware device for executing software, particularly software stored in the memory 306. Further, the processor 304 can interface with a database 314 that can store various amounts and types of data. For example, the database can store any of the types of communications data or resolved communications data described herein. The processor 304 can be any custom made or commercially available processor, such as, for example, a Core series or vPro processor made by Intel Corporation, or a Phenom, Athlon or Sempron processor made by Advanced Micro Devices, Inc. In the case where the computing device 300 is a server, the processor 304 may be, for example, a Xeon or Itanium processor from Intel, or an Opteron-series processor from Advanced Micro Devices, Inc. The processor 304 may also represent multiple parallel or distributed processors working in unison.

The memory 306 can include any one or a combination of volatile memory elements (e.g., random access memory (RAM, such as DRAM, SRAM, SDRAM, etc.)) and non-volatile memory elements (e.g., ROM, hard drive, flash drive, CDROM, etc.). Further, the memory 306 may incorporate electronic, magnetic, optical, and/or other types of storage media and can have a distributed architecture where various components are situated remote from one another, but are still accessed by the processor 304. These other components may reside on devices located elsewhere on a network or in a cloud arrangement.

The software in the memory 306 may include one or more separate programs or applications 310. The separate applications 310 comprise ordered listings of executable instructions for implementing logical functions, such as functions relating to receipt of requests and analysis of data, as discussed herein. In the example of FIG. 2, the software in the memory 306 may include a suitable operating system (O/S) 308. Examples of some operating systems 308 are Windows operating systems available from Microsoft Corporation, Mac OS X available from Apple Computer, Inc., a Unix operating system from AT&T, or a Unix-derivative such as BSD or Linux. The type of the operating system 308 will depend on the type of the computing device 300. The operating system 308 can control the execution of other computer programs, and can provide scheduling, input-output control, file and data management, memory management, and communication control and related services.

If the computing device 300 is an IBM PC compatible computer or the like, the software in the memory 306 may further include a basic input output system (BIOS). The BIOS is a set of essential software routines that initialize and test hardware at startup, start the operating system 308, and support the transfer of data among the hardware devices. The BIOS is stored in ROM so that the BIOS can be executed when the computing device 300 is activated.

Steps and/or elements, and/or portions thereof of the invention may be implemented using a source program, executable program (object code), script, or any other entity comprising a set of instructions to be performed. Furthermore, the software embodying the invention can be written as (a) an object oriented programming language, which has classes of data and methods, or (b) a procedural programming language, which has routines, subroutines, and/or functions, for example but not limited to, C, C++, C#, Pascal, Basic, Fortran, Cobol, Perl, Java, Ada, Lua, and Go. Components and entities as discussed herein may also be written in a proprietary language developed to interact with these known languages.

The I/O device(s) 302 may include input devices such as a keyboard, a mouse, a scanner, a microphone, a touch screen, a bar code reader, or an infra-red reader. It may also include output devices such as a printer, a video display, an audio speaker or headphone port or a projector. The I/O device(s) 302 may also comprise devices that communicate with inputs or outputs, such as a short-range transceiver (RFID, Bluetooth, etc.), a telephonic interface, a cellular communication port, a router, or other types of network communication equipment. The I/O devices 302 may be internal to the computing device 300, or may be external and connected wirelessly or via connection cable, such as through a universal serial bus port.

When the computing device 300 is in operation, the processor 304 is configured to execute software stored within the memory 306, to communicate data to and from the memory 306, and to generally control operations of the computing device 300 pursuant to the software. The operating system 308, in whole or in part, may be read by the processor 304, buffered within the processor 304, and then executed.

In the context of this document, a "computer-readable medium" may be any means that can store, communicate, propagate, or transport data objects for use by or in connection with the systems and methods as described herein. The computer readable medium may be for example, an electronic, magnetic, optical, electromagnetic, infrared, or semi-conductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. The systems and methods can be embodied in any type of computer-readable medium for use by or in connection with an instruction execution system or apparatus, such as a computer.

For purposes of connecting to other computing devices, the computing device 300 is equipped with network communication equipment and circuitry, including a communication module 312. In embodiments, the network communication equipment includes a network card such as an Ethernet card, or a wireless connection card. In a preferred network environment, each of the plurality of computing devices 300 on the network is configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while a preferred embodiment of the invention is for each computing device 300 to have a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks.

While one or more specific embodiments have been illustrated and described in connection with the invention(s), it is understood that the invention(s) should not be limited to any single embodiment, but rather construed in breadth and scope in accordance with recitation of the appended claims.

What is claimed is:

1. A system for integrated Application Programming Interface (API) platform and telecommunication session functionality within an inter-carrier network, the system comprising:
    an API server within the inter-carrier network, the API server allowing an application or web client access to voice and Short Message Service (SMS)/Multimedia Message Service (MMS) service functionality provided by the inter-carrier network;
    a telecommunications session server within the inter-carrier network and in communication with the API server and at least one voice soft switch element, the telecommunications session server providing telecommunication voice session functionality to the application or web client directly from the inter-carrier network as part of the Public Switched Telephone Network (PSTN); and
    an SMS/MMS gateway within the inter-carrier network and in communication with the API server, the SMS/MMS gateway providing SMS/MMS functionality to the application or web client directly from the inter-carrier network as part of the SMS/MMS network; and
    an operations support systems (OSS) server in communication with the API server, the telecommunications session server, the SMS/MMS gateway and the at least one voice soft switch element for network management of the inter-carrier network.

2. The system of claim 1, wherein the API server issues a Direct Inward Dialing (DID) number or short code upon request by the application or web client.

3. The system of claim 1, wherein a Direct Inward Dialing (DID) number or short code associated with the application or web client is provided by a third party network.

4. The system of claim 1, further comprising an API database associated with the API server having stored therein at least one library comprising a plurality of functional calls associated with voice and SMS/MMS functionality.

5. A method for providing Short Message Service (SMS)/Multimedia Message Service (MMS) functionality direct from an inter-carrier network via an Application Programming Interface (API) platform, the method comprising the steps of:
    providing an SMS/MMS API server within the inter-carrier network;
    receiving, at the API server within the inter-carrier network, from an application or web client utilizing the API, an SMS or MMS communication associated with a Direct Inward Dialing (DID) number or short code that is associated with an addressable device or network element;
    sending the SMS or MMS communication to an SMS/MMS gateway server within the inter-carrier network; and
    sending the SMS or MMS communication, from the SMS/MMS gateway server, to a network point within the SMS/MMS network having access to the addressable device or network element associated with a DID number or short code;
    wherein the DID number or short code was issued by the API server within the inter-carrier network.

6. A method for providing Short Message Service (SMS)/Multimedia Message Service (MMS) functionality direct from an inter-carrier network via an Application Programming Interface (API) platform, the method comprising the steps of:
    providing an SMS/MMS API server within the inter-carrier network;
    receiving, at the API server within the inter-carrier network, from an application or web client utilizing the API, an SMS or MMS communication associated with a Direct Inward Dialing (DID) number or short code that is associated with an addressable device or network element;
    sending the SMS or MMS communication to an SMS/MMS gateway server within the inter-carrier network; and
    sending the SMS or MMS communication, from the SMS/MMS gateway server, to a network point within the SMS/MMS network having access to the addressable device or network element associated with a DID number or short code;
    wherein the DID number or short code was issued by a third party network.

7. A system for integrated Application Programming Interface (API) platform and Short Message Service (SMS)/Multimedia Message Service (MMS) functionality within an inter-carrier network, the system comprising:
    an API server within the inter-carrier network, the API server allowing an application or web client access to SMS/MMS service functionality provided by the inter-carrier network;
    an SMS/MMS gateway within the inter-carrier network and in communication with the API server, the SMS/MMS gateway providing SMS/MMS functionality to the application or web client directly from the inter-carrier network as part of the SMS/MMS network; and
    an operations support systems (OSS) server in communication with the API server, a telecommunications server, and the SMS/MMS gateway for network management of the inter-carrier network.

8. The system of claim 7, wherein the API server issues a Direct Inward Dialing (DID) number or short code upon request by the application or web client.

9. The system of claim 7, further comprising an API database associated with the API server having stored therein at least one library comprising a plurality of functional calls associated with voice and SMS/MMS functionality.

* * * * *